US009300365B1

(12) United States Patent
Aoki et al.

(10) Patent No.: US 9,300,365 B1
(45) Date of Patent: Mar. 29, 2016

(54) WAVEGUIDE THAT ACTS AS A SPRING

(71) Applicant: Intel Corporation, Santa Clara, CA (US)

(72) Inventors: Russell S. Aoki, Tacoma, WA (US); John Trevor Morrison, Round Rock, TX (US); Gerald Rene Pelissier, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/577,428

(22) Filed: Dec. 19, 2014

(51) Int. Cl.
*H04B 5/00* (2006.01)
*H04B 10/25* (2013.01)

(52) U.S. Cl.
CPC .............. *H04B 5/0031* (2013.01); *H04B 10/25* (2013.01)

(58) Field of Classification Search
CPC ............ G01S 1/02; H01P 1/122; H01P 1/161
USPC .......... 455/81, 82, 83, 77, 90.3, 575.1, 575.3, 455/128; 361/679.09, 679.26
See application file for complete search history.

(56) References Cited

U.S. PATENT DOCUMENTS

| 7,543,997 | B1* | 6/2009 | McColloch | G02B 6/4201 385/88 |
| 2004/0150554 | A1* | 8/2004 | Stenger | H01P 1/047 342/175 |
| 2005/0248852 | A1* | 11/2005 | Yamasaki | G02B 27/0093 359/630 |
| 2008/0199132 | A1* | 8/2008 | Pitwon | G02B 6/4249 385/53 |
| 2012/0155005 | A1* | 6/2012 | Lee | G06F 1/1698 361/679.26 |
| 2013/0077812 | A1* | 3/2013 | Kishinami | H04M 1/0212 381/334 |
| 2014/0043745 | A1* | 2/2014 | McCormack | G06F 13/00 361/679.09 |

* cited by examiner

*Primary Examiner* — Minh D Dao
(74) *Attorney, Agent, or Firm* — Lee & Hayes, PLLC; Shiv S. Naimpally

(57) ABSTRACT

A computing device includes a head that can be physically attached to a base. The head is capable of functioning independent of the base. The base includes a base transceiver to receive data from a first component of the base, encode the data into a signal, and transmit the signal. The base includes a base waveguide to guide the signal to a head waveguide of the head. The base waveguide includes a first portion that is attached to the base and a second portion that is unattached to the base. The second portion of the base waveguide behaves as a spring to keep the base waveguide within a predetermined distance from the head waveguide. The head includes a head transceiver to receive the signal from the head waveguide, decode the data from the signal, and send the data to a second component of the head.

20 Claims, 9 Drawing Sheets

WAVEGUIDE THAT ACTS AS A SPRING

BACKGROUND

Near field communication (NFC) is a form of short-range wireless communication where an antenna that is smaller than a wavelength of the carrier signal may be used to transmit the carrier signal. In the near-field (approximately one quarter of a wavelength), the antenna may produce an electric field, a magnetic field, etc.

However, some forms of NFC may require that the transmitter and receiver be (i) in close proximity (e.g., 10 mm or less), (ii) within a line of sight, or both. Such usage restrictions may limit the applications in which NFC can be used.

SUMMARY

This Summary provides a simplified form of concepts that are further described below in the Detailed Description. This Summary is not intended to identify key or essential features and should therefore not be used for determining or limiting the scope of the claimed subject matter.

In some embodiments, a computing device comprises a head that can be physically attached to a base. The head may be capable of functioning as a computing device independent of the base. The base may include a base transceiver to receive data from a first component of the base, encode the data into a signal, and transmit the signal. The base may include a base waveguide to guide the signal to a head waveguide of the head. The head may include a head transceiver to receive the signal from the head waveguide, decode the data from the signal, and send the data to a second component of the head.

In some embodiments, a head of a computing device may be attached to a base of the computing device. Data from a first component of the base may be received at a base transceiver of the base. The base transceiver may encode the data into a signal. A base waveguide of the base may receive the signal from the base transceiver. The base waveguide may have a plurality of prongs. The signal may be transmitted from the base waveguide to a head waveguide of the head. A head transceiver of the head may receive the signal from the head waveguide. The head transceiver may decode the data from the signal and send the data to a second component of the head.

In some embodiments, a head of a computing device may be attached to a base of the computing device. Data from a first component of the head may be received at a head transceiver of the head. The head transceiver may encode the data into a signal. A head waveguide of the head may receive the signal from the head transceiver. The signal may be transmitted from the head waveguide to a base waveguide of the base. The base waveguide may have a plurality of prongs. A base transceiver of the base may receive the signal from the base waveguide. The base transceiver may decode the data from the signal and send the data to a second component of the base.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
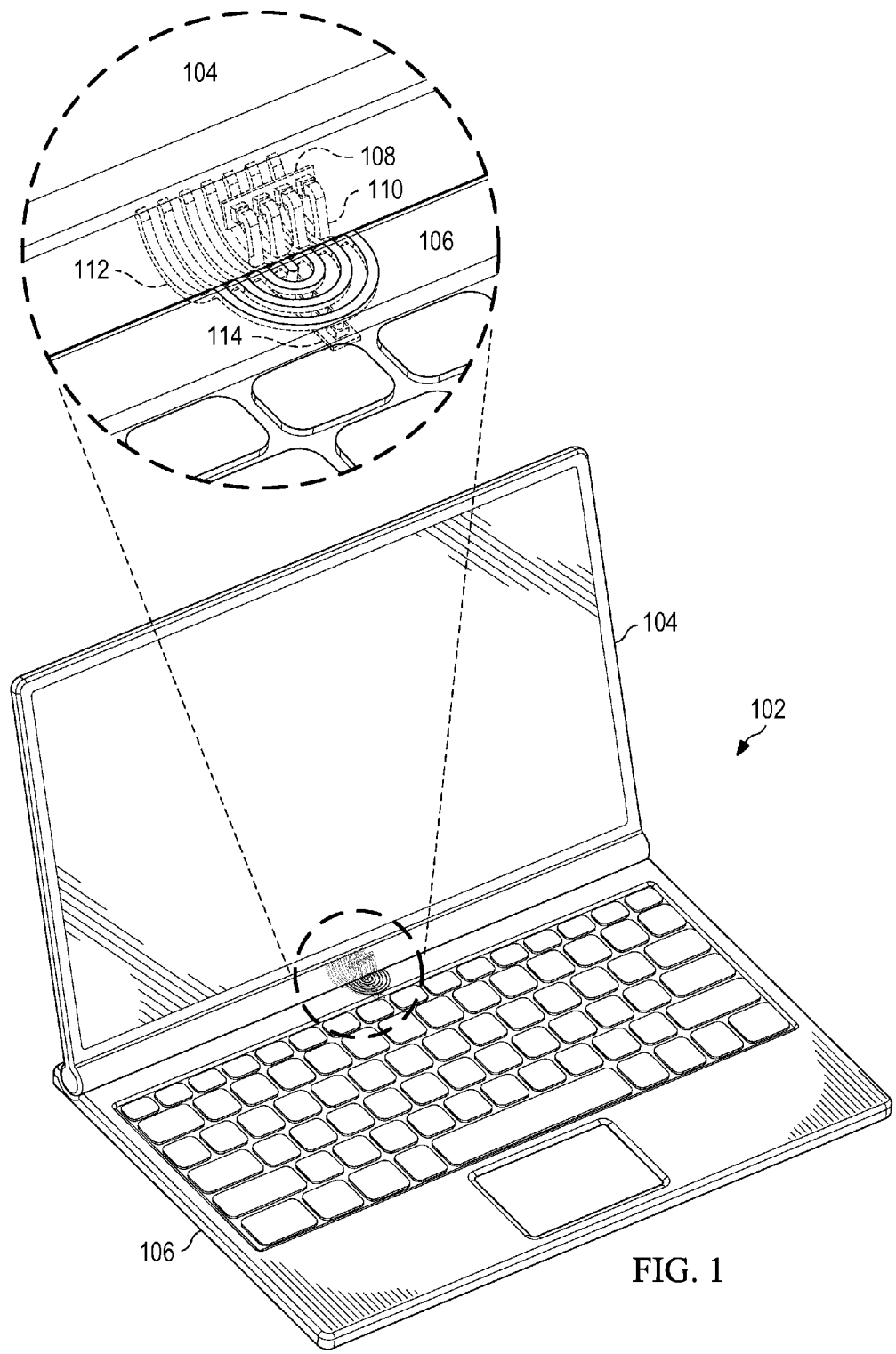
FIG. 1 illustrates an example of a computing device that includes a head and a base according to some embodiments.

As computing devices, such as tablets, notebooks, wireless phones, and the like continue to proliferate, many of these devices may be designed using two or more components. For example, a computing device, such as a "2-in-1" computing device, may include two components, such as a head component ("head") and a base component ("base"). The head may include a touchscreen display device and may be independently usable as a computing device, such as a tablet computer or a wireless phone. In addition, attaching the head to the base may enable the head to access resources that are included in the base, such as one or more input devices (e.g., keyboard, touch pad, keypad, etc.), one or more storage devices (e.g., random access memory (RAM), read only memory (ROM), other types of memory, disk drives, other types of storage devices, etc.), one or more ports (e.g., a universal serial bus (USB) port, a serial port, a digital video interface (DVI) port, a high definition multimedia interface (HDMI) port, a card reader (e.g., for reading a compact flash card, a secure digital (SD) card, etc.), another type of resource, or any combination thereof. In this way, the 2-in-1 computing device may be used as two devices, e.g., either as a first type of computing device (e.g., such as a tablet, when using just the head) or as a second type of computing device (e.g., such as a laptop, when the head is coupled to the base).

In a conventional 2-in-1 computing device, the head may be electrically coupled to the base using electrical contacts that enable the head and base to communicate with each other (e.g., to enable the head to access the resources of the base, etc.). However, having exposed electrical contacts on the head and the base may result in the electrical contacts becoming corroded, dirty, worn, damaged, or any combination thereof. Therefore, a 2-in-1 computing device that uses near field communication (NFC) to enable the head to communicate with the base may avoid problems caused by the electrical contacts becoming corroded, dirty, worn, damaged, etc.

A 2-in-1 computing device may be designed such that when the head is coupled to the base, the head may rotate relative to the base. For example, the head of the 2-in-1 computing device may rotate relative to the base to enable a user to position the screen at a particular viewing angle, similar to the way the user may position a screen of a laptop. When NFC is used to enable communications between the head and the base, a first transmitter/receiver (referred to hereinafter as a "transceiver") may be included in the head and a second transceiver may be included in the base. The NFC may work when the first transceiver and the second transceiver are (i) in close proximity (e.g., 10 mm or less) and (ii) within a line of sight but may not work if they are greater than 10 mm apart or not within a line of sight.

To enable NFC-based communications between a head and a base in a 2-in-1 computing device where the head is capable of rotating relative to the base, one or more waveguides may be used to receive a transmission from a transmitter (e.g., a first transceiver) and provide (e.g., transmit) the transmission to a receiver (e.g., a second transceiver). A waveguide is a structure that guides waves, such as electromagnetic waves, from the first transceiver to the second transceiver. For example, the waveguide may vibrate in response to receiving a signal (e.g., carrier signal) from a transmitter and transmit the vibrations to a receiver. The waveguide may be made from a material such as plastic, metal, glass, wood, another type of material, or any combination thereof.

Thus, one or more transceivers and one or more waveguides may be used to enable communications between a head and a base of a 2-in-1 computing device to enable the head to be positioned at different angles such that the transceivers in the head and base do not need to be in close proximity nor within a line of sight of each other.

In some embodiments, the waveguide may use a design that enables the head to be attached to the base in either a forward configuration or a reverse configuration. For example, the waveguide may include multiple prongs, where a first portion of the prongs are used for communications when the head is attached to the base in the forward configuration and a second portion of the prongs are used when the head is attached to the base in the reverse configuration. The waveguide may act as a spring such that the distance between the head and the base is no more than a predetermined distance, thereby resulting in efficient wireless signal transmission between the head and the base. For example, when the head is attached to the base, the waveguide may act as a spring to keep the gap between the head and the base within a wireless transmission tolerance, such that the head and the base can transmit signals to each other, regardless of the position of the head relative to the base. Without the spring action of the waveguide, the gap between the head and the base may vary (e.g., when the head is placed at different angles relative the base), and in some cases, result in a gap that is sufficiently large that wireless transmission between the head and the base is not possible.

FIG. 1 illustrates an example of a computing device that includes a head and a base according to some embodiments. FIG. 1 includes a computing device 102 that is comprised of a head 104 and a base 106.

The head 104 may include a display, one or more processors, and computer-readable storage media to store instructions. The one or more processors may access the computer-readable storage media to execute the instructions to perform various functions. For example, the head 104 may be detached from the base 106 for use as a tablet computing device. The head 104 may receive input via a touch screen display using a finger (or other appendage), a stylus, a keyboard superimposed on the touch screen display, another type of touch input mechanism, or any combination thereof. The head 104 may receive input via buttons, a microphone (e.g., using voice recognition), another type of input mechanism, or any combination thereof.

The base 106 may include resources, such as one or more input devices (e.g., a keyboard, a touch pad, etc.), one or more storage devices (e.g., random access memory (RAM), disk drives, etc.), one or more input/output (I/O) ports (e.g., a universal serial bus (USB) port, a high definition multimedia interface (HDMI) port, a card reader (e.g., for reading a compact flash card, a secure digital (SD) card, etc.), another type of computing resource, or any combination thereof. When the head 104 is coupled to the base 106, the head 104 and the base 106 may be capable of contactless communication with each other. When coupled to the base 106, the head 104 may access one or more of the resources of the base 106. For example, the head 104 may receive input from the input devices of the base 106. The head 104 may display the input received from the base on the touchscreen display device of the head 104. The head 104 may store data on a storage device of the base 106. The head 104 may retrieve data stored on a storage device of the base 106 (or connected to the base 106 using an I/O port) and display at least part of the data on the touchscreen display device of the head 104. Of course, other examples of a head and a base may have other I/O devices and components.

The head 104 may be capable of being physically coupled to the base 106 and later de-coupled from the base 106. The base 104 includes a head transceiver 108 and a head waveguide 110. The base 106 includes a base waveguide 112 and a base transceiver 114. In some embodiments, the head waveguide 110 may be mounted off-center in such a way that the head waveguide 110 is in close proximity to a first portion of the base waveguide 112 in a forward orientation and, when the head 104 is reversed relative to the base 106, the head waveguide 110 is in close proximity to a second portion of the base waveguide 112 in a reverse orientation.

The transceivers 108, 114 and waveguides 110, 112 may operate at radio frequencies in the extremely high frequency (EHF) band, e.g., between 30 Gigahertz (GHz) and 300 GHz. For example, in a particular embodiment, the transceivers 108, 114 may communicate at approximately 60 GHz. In some embodiments, the transceivers 108, 114 may be implemented using a technology such as complementary metal oxide semiconductor (CMOS). The transceivers 108, 114 may be capable of transmitting and receiving signals with a bandwidth of 5 Gigabits per second (Gbps) or more. The transceivers 108, 114 and waveguides 110, 112 do not make contact each other. The transmitter component of the transceivers 108, 114 is used to transmit signals and the receiver component of the transceivers 108, 114 is used to receive signals.

When transmitting from the head 104 to the base 106, the head transceiver 108 may receive data from a component of the head 104, encode the data into a signal (e.g., carrier signal), and transmit the signal. The head waveguide 110 may conduct (e.g., guide) the signal to the base waveguide 112. The base waveguide 112 may conduct the signal to the base transceiver 114. The base transceiver 114 may receive the signal, decode the data from the signal, and send the data to one or more of the components (e.g., resources) of the base 106.

When transmitting from the base 106 to the head 104, the base transceiver 114 may receive data from a component of the base 106 and encode the data into the a signal. The base waveguide 112 may conduct (e.g., guide) the signal to the head waveguide 110. The head waveguide 110 may conduct the signal to the head transceiver 108. The head transceiver 108 may receive the signal, extract (e.g., decode) the data from the signal, and send the to one or more of the components of the head 104.

Thus, a computing device 102 may include a head 104 and a base 106 that uses contactless communication to communicate with each other when the head 104 is physically coupled to the base 106. The contactless communication may be achieved using a first transceiver that receives data and transmits the data using an EHF signal as the carrier. A first waveguide may transmit the EHF signal to a second waveguide. The second waveguide may receive the EHF signal and guide the signal to a second transceiver that extracts the data from the signal and sends the data to a destination. The waveguides 110, 112 and transceivers 108, 114 may be positioned to enable the head to rotate relative to the base. For example, a user may place the head 104 in different orientations (e.g., a forward orientation or a reverse orientation) and at different angles relative to the base 106 without affecting the ability of the head 104 and the base 106 to communicate with each other.

Figure 2:
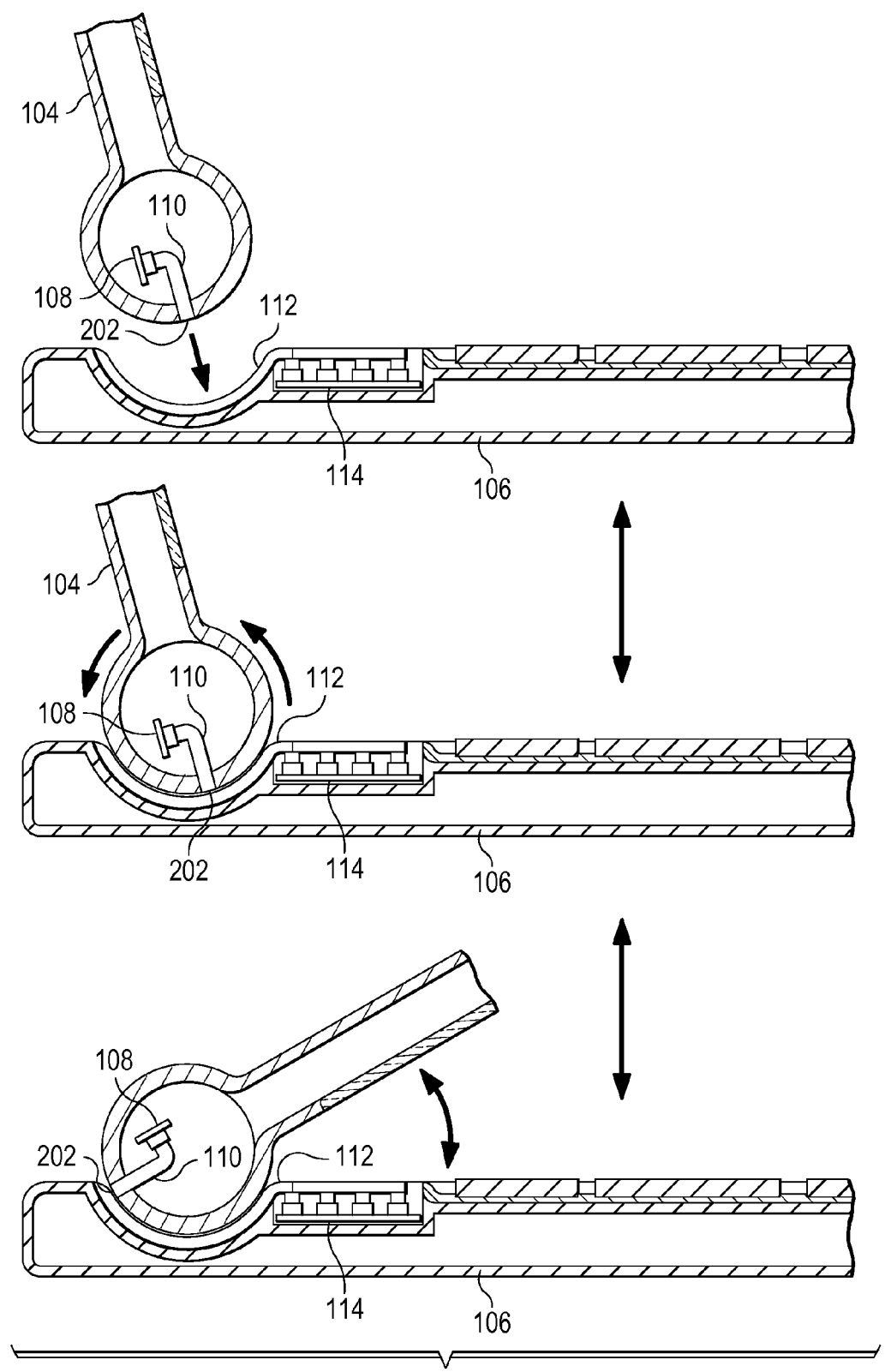
FIG. 2 illustrates an example of a head of a computing device coupling to a base according to some embodiments.

FIG. 2 illustrates an example of a head of a computing device coupling to a base according to some embodiments. FIG. 2 shows how the head 104 may physically couple to the base 106. For example, the head 104 may include a cylindrical protrusion that may be placed into a semi-circular groove in the base 106 to couple the head 104 to the base 106.

After the head 104 is coupled to the base 106, the head 104 may be placed at various angles relative to the base 106, while the distance between a tip 202 of the head waveguide 110 and the base waveguide 112 is relatively constant (e.g., does not change significantly), as shown in FIG. 2. The tip 202 of the head waveguide 110 is a portion of the head waveguide 110 that is located at an opposite end from the head transceiver 108. Thus, the distance between the tip 202 of the head waveguide 110 and the base waveguide 112 may remain relatively constant, thereby enabling contactless communication between the head 104 and the base 106 regardless of the angle between the head 104 and the base 106.

Figure 3:
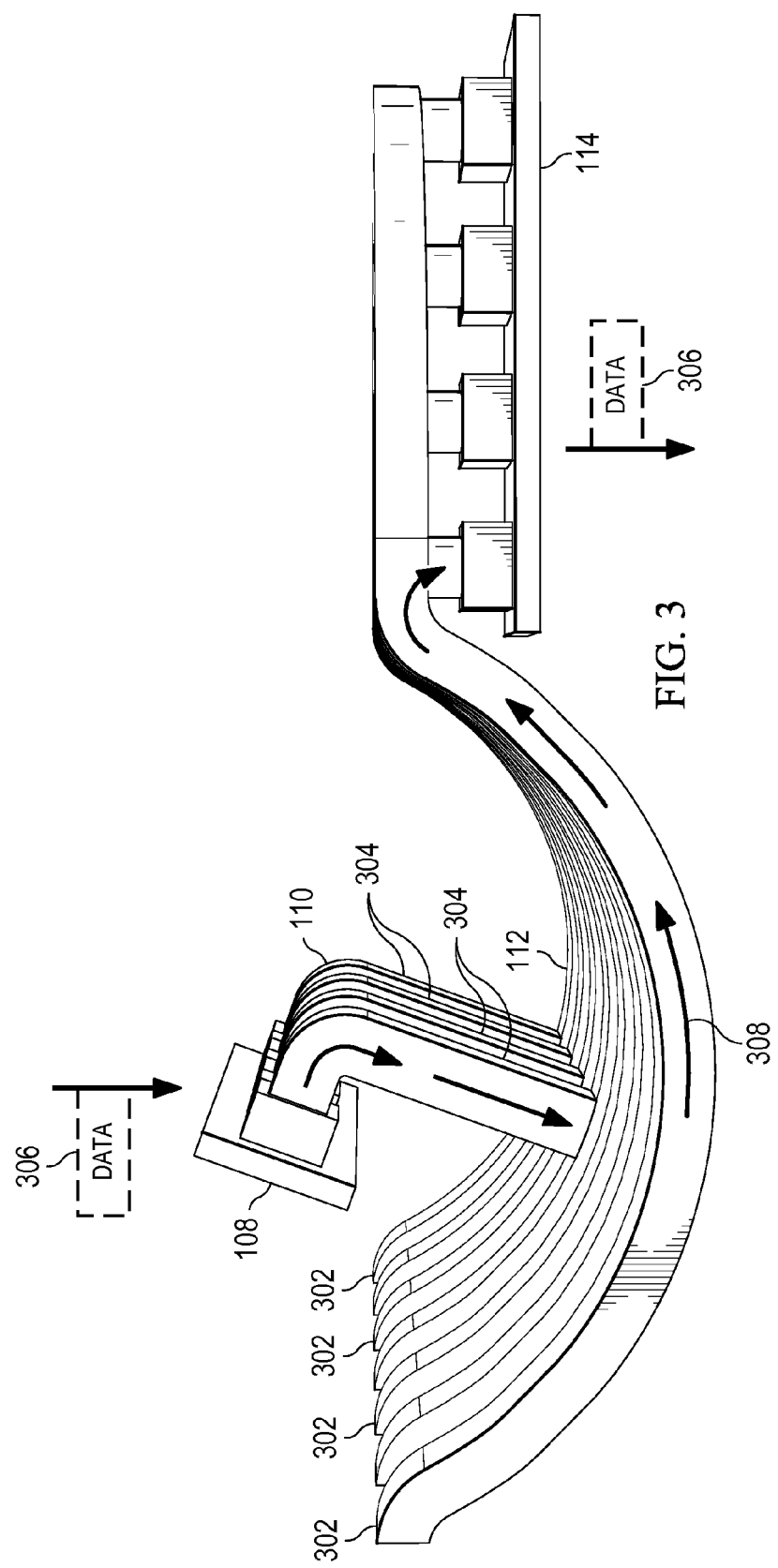
FIG. 3 illustrates an example of a head waveguide and a base waveguide according to some embodiments.

FIG. 3 illustrates an example of a head waveguide and a base waveguide according to some embodiments. FIG. 3 illustrates how the distance between the head waveguide 110 and the base waveguide 112 remains relatively constant regardless of the angle between the head 104 and the base 106, thereby enabling contactless communication between the head 104 and the base 106.

The head waveguide 110 includes at least one prong 302. Purely for illustration purposes, the head waveguide 110 is illustrated in FIG. 2 as including seven prongs. Of course, depending on the embodiment, the head waveguide 110 may have more than seven prongs or few than seven prongs. The base waveguide 112 includes at least one prong 304. In embodiments where the head 104 may be coupled to the base 106 in both a forward orientation and a reverse orientation, the base waveguide 112 may include at least two prongs, e.g., at least one prong for the forward orientation and at least one prong for the reverse orientation.

As illustrated in FIG. 3, when transmitting from the head 104 to the base 106, the head transceiver 108 may receive data 306 from a component of the head 104 and encode the data 306 into a signal 308. The head waveguide 110 may conduct (e.g., guide) the signal 308 to the base waveguide 112. The base waveguide 112 may conduct the signal 308 to the base transceiver 114. The base transceiver 114 may receive the signal 308, extract the data 306 from the signal 308, and send the data 306 to one or more of the components (e.g., resources) of the base 106.

When transmitting from the base 106 to the head 104, the base transceiver 114 may receive data 306 from a component of the base 106 and encode the data 306 into a signal 308. The base waveguide 112 may conduct (e.g., guide) the signal 308 to the head waveguide 110. The head waveguide 110 may conduct the signal 308 to the head transceiver 108. The head transceiver 108 may receive the signal 308, extract the data 306 from the signal 308, and send the data 306 to one or more of the components (e.g., the touchscreen display) of the head 104.

Thus, the waveguides 110, 112 may include one or more prongs 302, 304 that are used to guide a signal from one waveguide to another waveguide. The transceivers 108, 114 may encode the data 302 into the signal 304 for transmission via the waveguides 110, 112 and decode the data 302 from the signal 304.

Figure 4A:
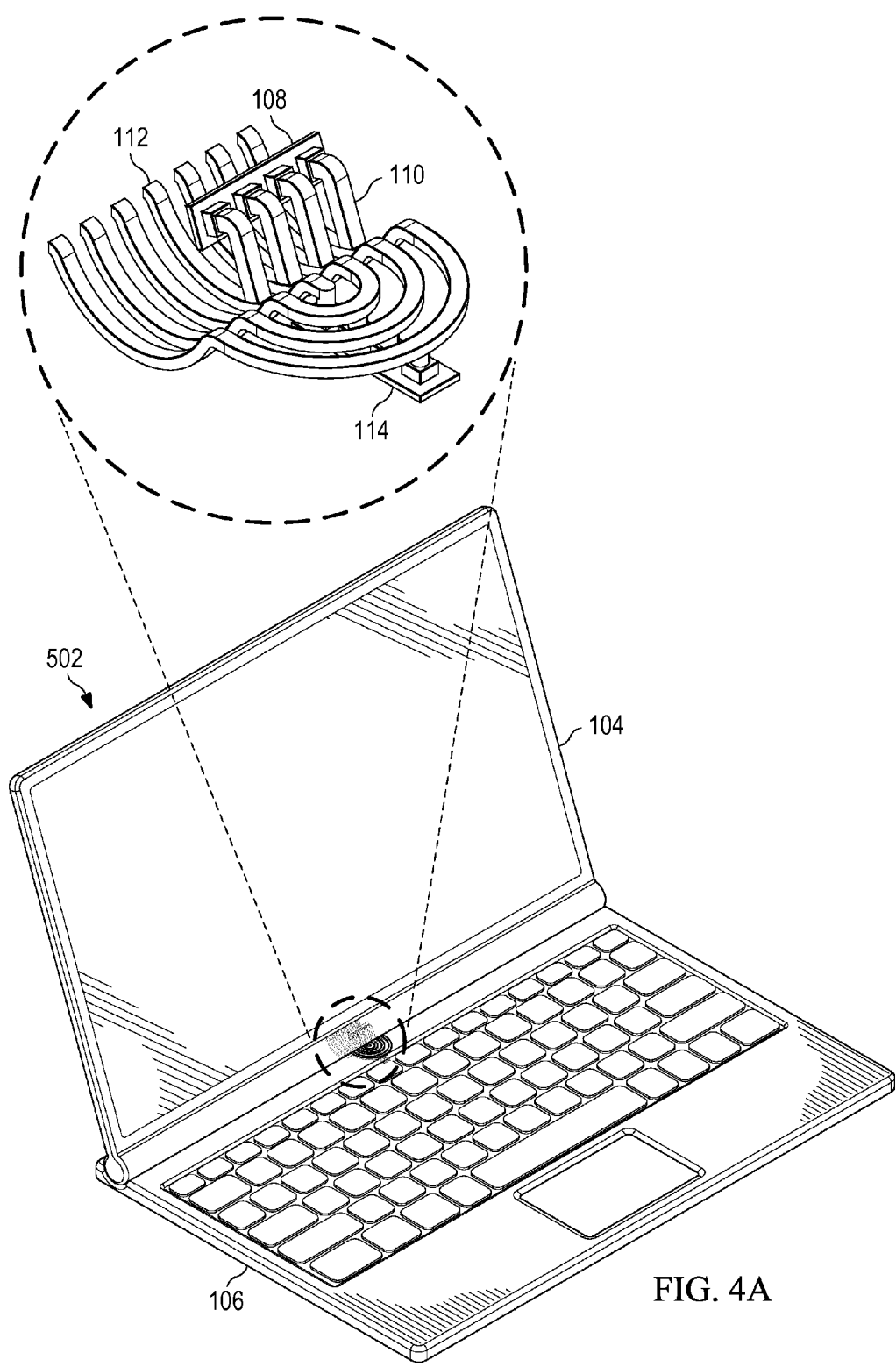
FIG. 4A illustrates an example of a forward orientation of a head and a base according to some embodiments.

FIG. 4A illustrates an example of a forward orientation of a head and a base according to some embodiments. In the forward orientation 502, the head 104 may be attached to the base 106 in such a way that a touchscreen display of the head 104 may face forward, e.g., towards a user. In the forward orientation 502, the prongs of the head waveguide 110 may be positioned in close proximity to (e.g., over) a first portion of the prongs of the base waveguide 112. For example, the prongs of the head waveguide 110 may be positioned in close proximity to the middle prong and the prongs to the right of the middle prong of the base waveguide 112.

Figure 4B:
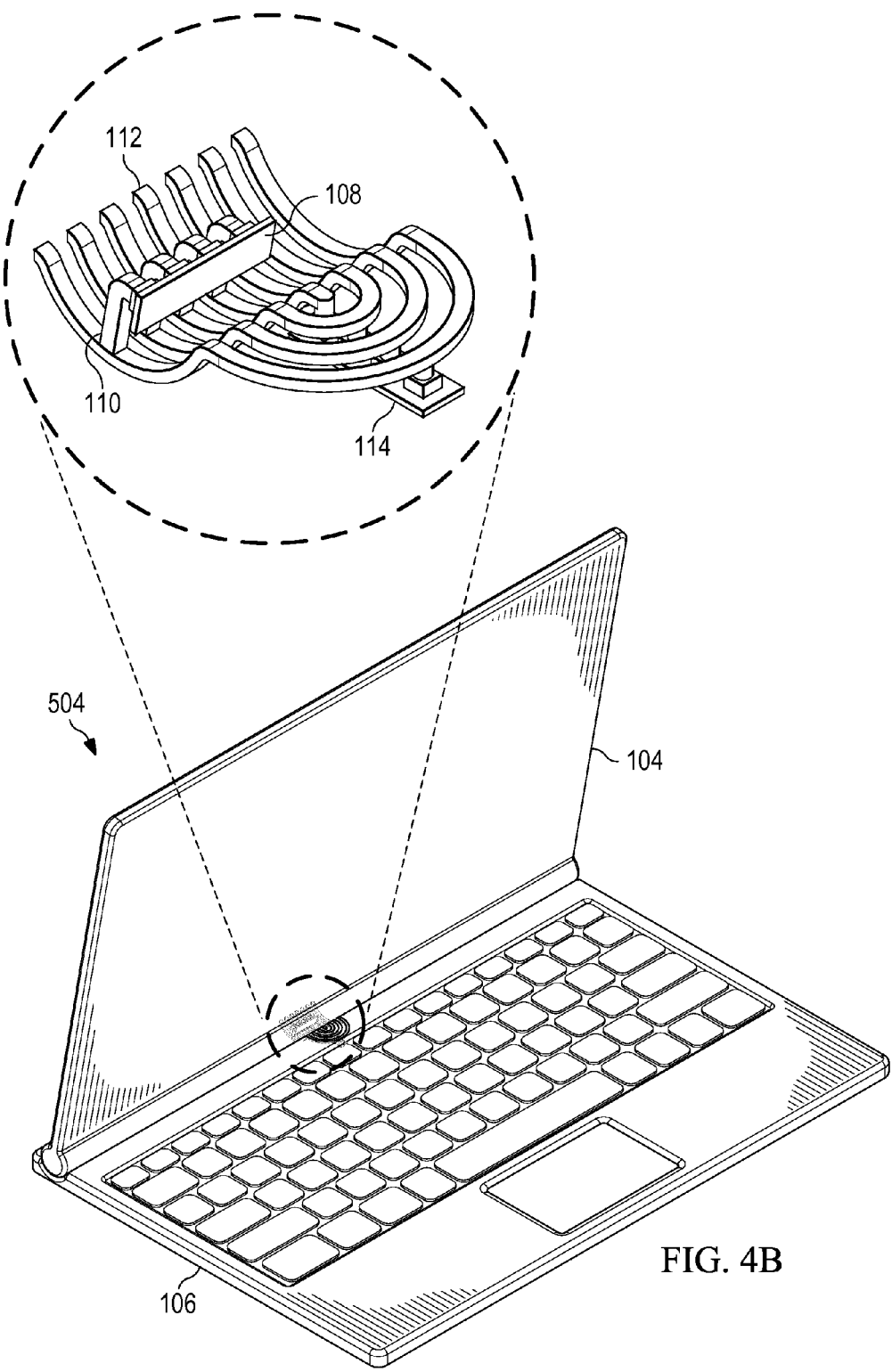
FIG. 4B illustrates an example of a reverse orientation of a head and a base according to some embodiments.

FIG. 4B illustrates an example of a reverse orientation of a head and a base according to some embodiments. In the reverse orientation 504, the head 104 may be attached to the base 106 in such a way that a touchscreen display of the head 104 may face back, e.g., away from a user. For example, a user may use the reverse orientation 504 to display something to another person or the user may position the head over the base to enable the computing device 102 to be used as a tablet computer. In the reverse orientation 504, the prongs of the head waveguide 110 may be positioned in close proximity to (e.g., over) a portion of the prongs of the base waveguide 112. For example, the prongs of the head waveguide 110 may be positioned in close proximity to the middle prong and the prongs to the left of the middle prong of the base waveguide 112.

While the base waveguide 112 is illustrated as including U-shaped prongs, in some embodiments, different shaped prongs may be used to enable multiple orientations. In embodiments that enable the head 104 to attach to the base 106 in more than one orientation, the prongs of the base waveguide 112 may be arranged symmetrically to enable the forward orientation 502 and the reverse orientation 504.

Figure 5:
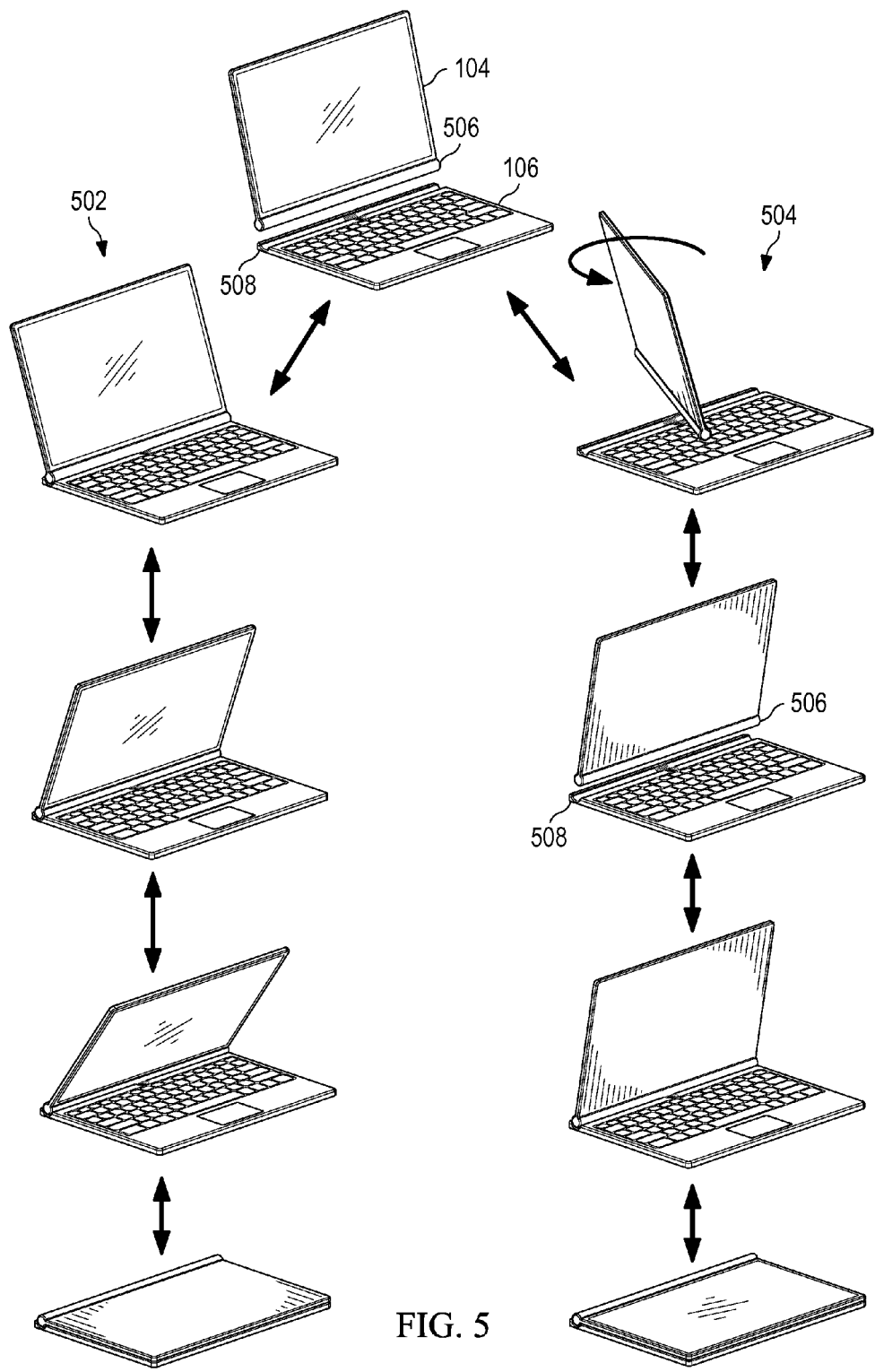
FIG. 5 illustrates examples of different placements of a head relative to a base according to some embodiments.

FIG. 5 illustrates examples of different placements of a head relative to a base according to some embodiments. The head 104 may be attached to the base 106 in a forward orientation 502 or in a reverse orientation 504. For example, the head 104 may be attached to the base 106 by placing a cylindrically shaped end 506 of the head 104 in a groove 508 (e.g., semi-circular shaped groove) of the base 106. In the forward orientation 502, the head 104 may be attached to the base 106 such that the touchscreen display is facing a user of the computing device 102. In the reverse orientation 504, the head 104 may be attached to the base 106 such that the touchscreen display is facing away from the user of the computing device 102.

As illustrated in FIG. 5, in both the forward orientation 502 and the reverse orientation 504, the head 104 may be placed at different angles relative to the base 106. For example, in both the forward orientation 502 and the reverse orientation 504, the head 104 may be placed at angles between 0 and 180 degrees relative to the base 106. The waveguides 110, 112 may provide a contactless connection between the head 104 and the base 106 to enable the head 104 to communicate with the base 106 regardless of the position of the head 104 relative to the base 106.

Figure 6:
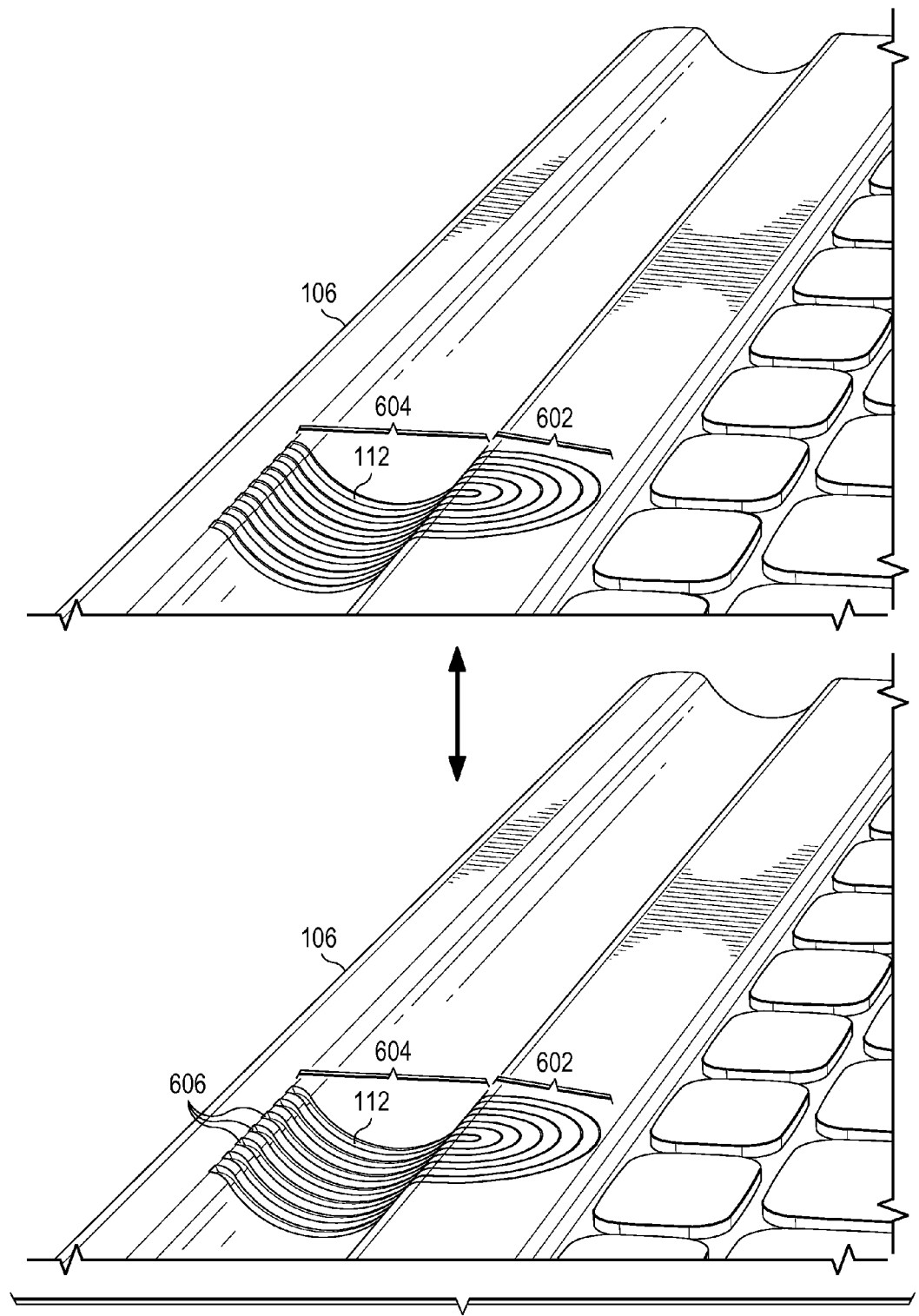
FIG. 6 illustrates an example of a waveguide that acts as a spring according to some embodiments.

FIG. 6 illustrates an example of a waveguide that acts as a spring according to some embodiments. The base waveguide 112 may have two portions, e.g., a first portion 602 and a second portion 604. In some embodiments, the first portion 602 may be relatively straight while the second portion 604 of the base waveguide 112 may be semi-circular. For example, the second portion 604 of the base waveguide 112 may be semi-circular to enable the circular portion of the head 104 to fit into a hollowed out portion of the base 106. The second portion 604 may be located within corresponding grooves 606 in the base 106.

In some embodiments, the first portion 602 of the base waveguide 112 may be attached to the base 106 while the second portion 604 may be unattached, thereby allowing the second portion 604 to move up and down within the corresponding grooves 606 in the base 106. Because the second portion 604 is not attached and is able to move up and down within the corresponding grooves 606, the second portion 604 of the base waveguide 112 may act as a spring (e.g., an elastic object that may be used to store mechanical energy). The stored mechanical energy may be used in different ways, depending on the design and shape of the base waveguide 112, as discussed further in FIG. 7.

When the head 104 is attached (e.g., coupled) to the base 106, the base waveguide 112 may act as a spring to keep the head waveguide 110 and the base waveguide 112 within a predetermined range. For example, the base waveguide 112 may act as a spring to keep the head waveguide 110 and the base waveguide 112 no more than 0.2 mm in distance from each other. This may be achieved by having the unattached portion 604 of the base waveguide 112 "float" inside the base 106. When the cylindrical portion of the head 104 comes into contact with the base waveguide 112, the cylindrical portion of the head 104 may push down on the base waveguide 112 to enable the head waveguide 110 and the base waveguide 112 to be no more than a predetermined distance (e.g., 0.2 mm) apart.

Figure 7:
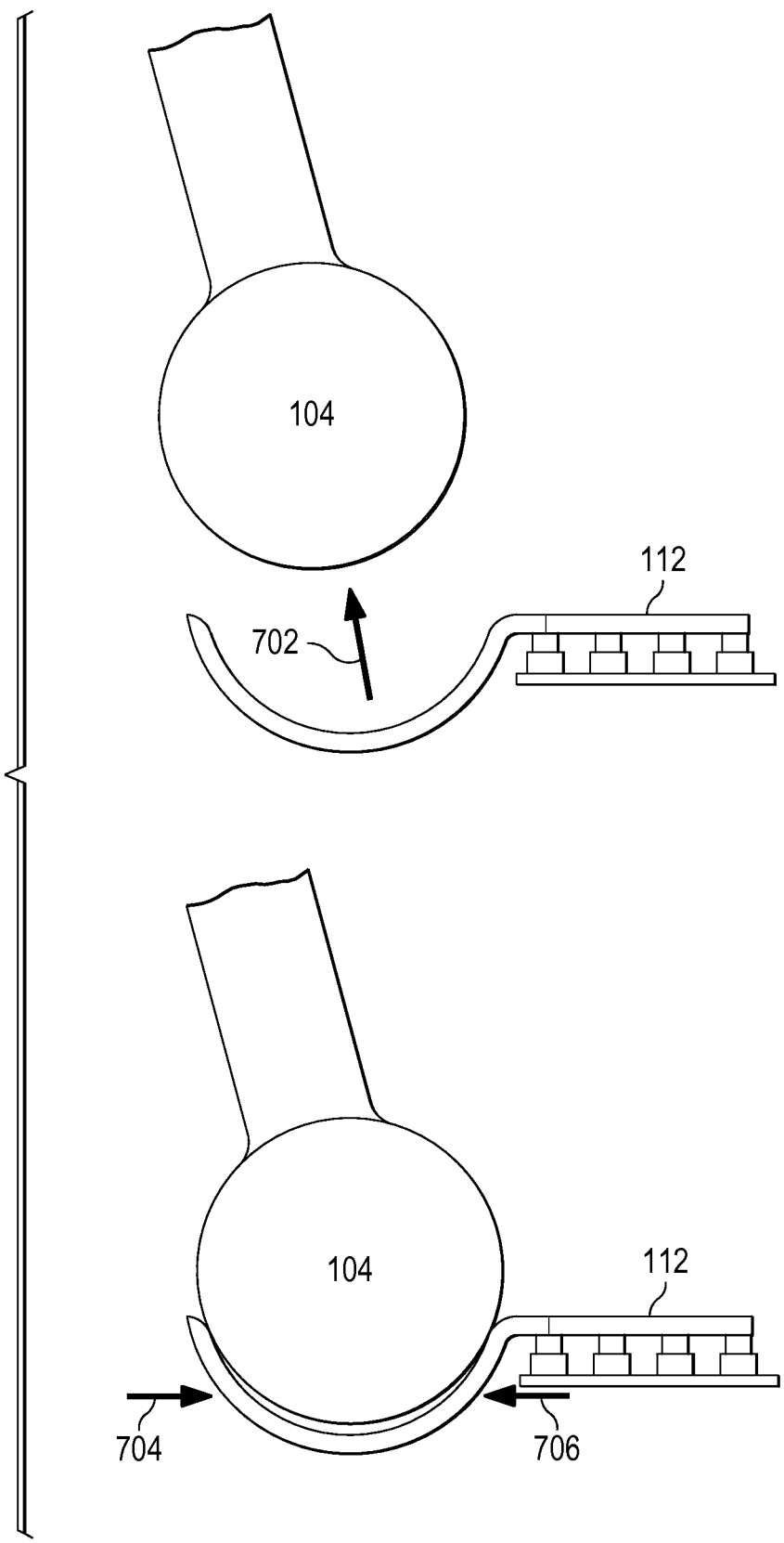
FIG. 7 illustrates an example of how a waveguide that acts as a spring can provide force according to some embodiments.

FIG. 7 illustrates an example of how a waveguide that acts as a spring can provide force according to some embodiments. The base waveguide 112 may act as a spring to provide a mechanical gap between the head 104 and the base 106 that is no more than a predetermined distance, thereby resulting in efficient wireless signal transmission between the head 104 and the base 106. When the head 104 is attached to the base 106, the base waveguide 112 acts as a spring to keep the gap between the head waveguide 110 and the base waveguide 112 within a wireless transmission tolerance, such that the head 104 and the base 106 (e.g., using the head waveguide 110 and the base waveguide 112) can transmit signals to each other, regardless of the position of the head 104 relative to the base 106. Without the spring action of the base waveguide 112, the gap between the head waveguide 110 and the base waveguide 112 may vary (e.g., when the head 104 is placed at different angles relative the base 106), and in some cases, result in a gap that is sufficiently large that wireless transmission between the head waveguide 110 and the base waveguide 112 is not possible.

The second portion 604 may absorb incidental physical contact received by the head 104 and/or the base 106, provide stored mechanical energy 702 when a user is detaching the head 104 from the base 106, provide stored mechanical energy 704, 706 to keep the head 104 from inadvertently detaching from the base 106 due to incidental physical contact received by the head 104 and/or the base 106 (e.g., the two ends of the unattached portion 604 may provide tension 704, 706 to the cylindrical portion of the head 104), another type of action that can be performed by a spring, or any combination thereof.

Figure 8:
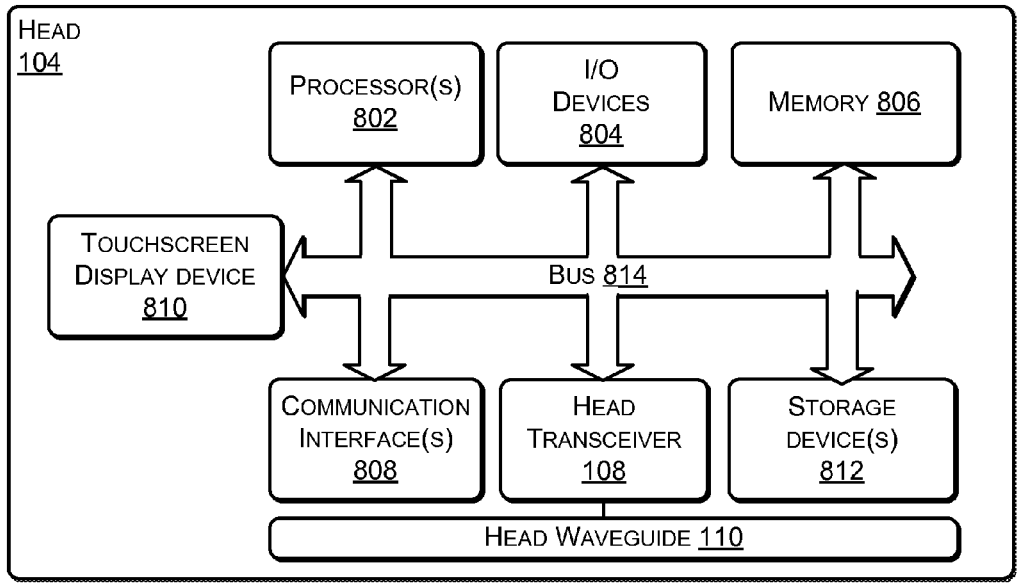
FIG. 8 illustrates an example configuration of a head and base of a computing device that can be used to implement the systems and techniques described herein.
Figure 8:
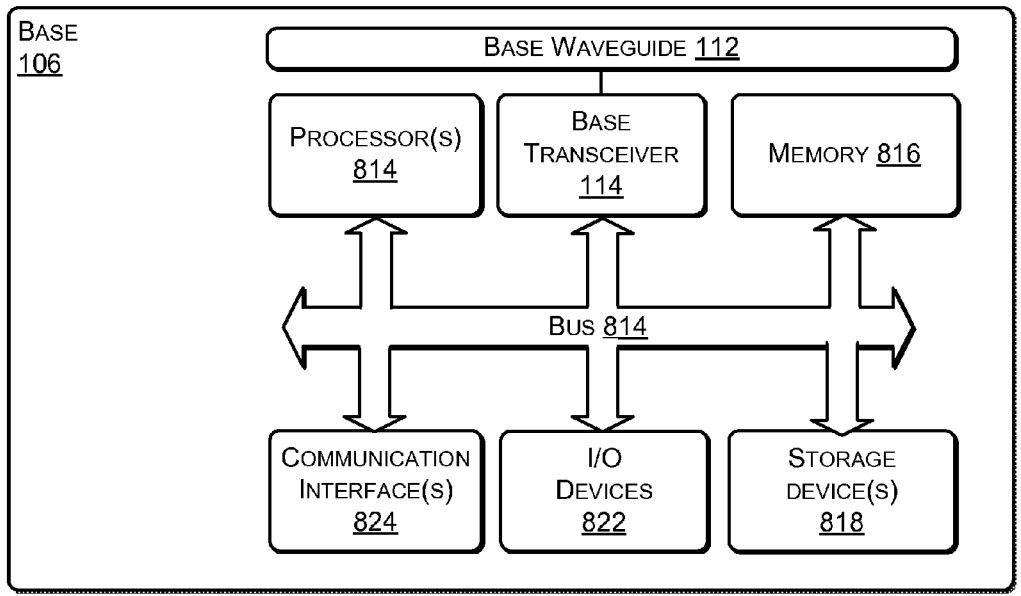

FIG. 8 illustrates an example configuration of a head and base of a computing device that can be used to implement the systems and techniques described herein. The head 104 may include one or more processors 802, one or more input/output (I/O) devices 804, a memory 806, one or more communication interfaces 808, the head transceiver 108, and the head waveguide 110. In some embodiments, the head 104 may include one or more storage devices 812. The touchscreen display device 810 may be capable of receiving input via an appendage (e.g., a finger), an instrument (e.g., a stylus), or other type of input mechanism that is capable of generating touch. The base 106 may include one or more processors 814, the base transceiver 114, the base waveguide 112, a memory 816, one or more storage devices 818, one or more I/O devices 822, and one or more communication interfaces 824.

The I/O devices 804, 822 may each include, but are not limited to, one or more of a keyboard, a keypad, a touch pad, a mouse, a trackball, a speaker, a microphone, a camera, another type of input device, or any combination thereof. The communication interfaces may include interfaces compatible with wired protocols, such as Ethernet, high definition media interface (HDMI), digital video interface (DVI), Data Over Cable Service Interface Specification (DOCSIS), digital subscriber line (DSL), or the like. The communication interfaces compatible with wireless protocols, such as code division multiple access (CDMA), global system mobile (GSM), WiFi (e.g., 8012.11), BlueTooth, or the like. The storage devices 812, 818 may include mass storage devices, such as disk drives, solid state drives (SSDs), etc.

Processors 802, 814 may be a microprocessor, controller, a programmable logic device such as a Field Programmable Gate Array (FPGA), an application specific integrated circuit (ASIC), or other hardware resource operable to provide computing device functionality for the head 104 and the base 106, respectively.

Memory 806, 816 may be any form of volatile or non-volatile memory including, magnetic media, optical media, random access memory (RAM) including dynamic RAM (DRAM) and static RAM (SRAM), read-only memory (ROM), erasable/programmable memory, solid state memory such as flash memory, removable media, or any other suitable local or remote memory component or components. In particular embodiments, memory 806, 816 may include random access memory (RAM). This RAM may be volatile memory. Memory 806, 816 may include one or more memories. Memory 806, 816 may store any suitable data or information utilized by the computing device 102, including one or more software modules embedded in a computer-readable medium, and/or encoded logic incorporated in hardware. In particular embodiments, memory 806 may include main memory for storing instructions for processors 802 to execute and memory 816 may include main memory for storing instructions for processors 814 to execute. In particular embodiments, one or more memory management units (MMUs) may reside between the processors 802 and memory 806 and facilitate accesses to memory 806 requested by processors 802 and one or more memory management units (MMUs) may reside between the processors 814 and memory 816 and facilitate accesses to memory 816 requested by processors 814. As used herein, memory 806, 816 do not include purely transitory media, such as signals and communication media. As such, memory is a form of non-transitory computer-readable media. As used herein, non-transitory computer-readable media includes one or more of optical storage, magnetic storage, RAM, ROM, solid-state memory such as flash memory, a hard disk drive, a floppy drive, tape storage, a smart card, an integrated circuit, and so forth.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computing device comprising:
 a head comprising:
  a head transceiver to:
   receive data from a first component of the head;
   encode the data into a signal; and
   transmit the signal;
  a head waveguide to guide the signal; and
 a base comprising:
  a base waveguide to receive the signal from the head waveguide, the base waveguide including a first portion that is attached to the base and a second portion that is unattached to the base, the second portion of the base waveguide behaving as a spring to keep the base waveguide within a predetermined distance from the head waveguide regardless of a position of the head relative to the base.

2. The computing device of claim 1, wherein the base further comprises:
 a base transceiver to:
  receive the signal from the base waveguide;
  decode the data from the signal; and
  send the data to a second component of the base.

3. The computing device of claim 1, wherein:
 the base waveguide comprises a plurality of prongs; and
 the head waveguide comprises at least one prong.

4. The computing device of claim 3, wherein the plurality of prongs includes at least one substantially U-shaped prong.

5. The computing device of claim 3, wherein:
 when the head is attached to the base in a forward orientation, the head waveguide is positioned over a first portion of the plurality of prongs of the base waveguide; and
 when the head is attached to the base in a reverse orientation, the head waveguide is positioned over a second portion of the plurality of prongs in the reverse orientation, the second portion having at least one prong that is excluded from the first portion.

6. The computing device of claim 1, wherein the head transceiver transmits the signal at a frequency between about 50 GHz and about 70 Ghz.

7. The computing device of claim 1, wherein:
 the predetermined distance is about 0.2 millimeters.

8. A method comprising:
 receiving, at a head transceiver of a head of a computing device, data from a first component of the head, the head attached to a base of the computing device;
 encoding, by the head transceiver, the data into a signal;
 receiving, by a head waveguide of the head, the signal from the head transceiver;
 transmitting the signal from the head waveguide to a base waveguide of the base, the base waveguide including a plurality of prongs, wherein a first portion of the base waveguide is attached to the base and a second portion of the base waveguide is unattached to the base, the second portion of the base waveguide behaving as a spring to keep the base waveguide no more than a predetermined distance from the head waveguide;
 receiving, by a base transceiver of the base, the signal from the base waveguide;
 decoding, by the base transceiver, the data from the signal; and
 sending the data to a second component of the base.

9. The method of claim 8, wherein:
 the head includes a substantially cylindrically shaped end that attaches to a groove in the base; and
 the second portion of the base waveguide exerts force on the substantially cylindrically shaped end of the head to prevent the head from inadvertently detaching from the groove in the base.

10. The method of claim 8, wherein the predetermined distance is about 0.2 millimeters (mm).

11. The method of claim 8, wherein attaching the head of the computing device to the base of the computing device comprises attaching the head to the base in one of a forward orientation or a reverse orientation.

12. The method of claim 8, wherein attaching the head of the computing device to the base of the computing device comprises attaching the head to the base in a forward orientation, the head waveguide positioned over a first portion of a plurality of prongs of the base waveguide in the forward orientation.

13. The method of claim 12, wherein attaching the head of the computing device to the base of the computing device comprises attaching the head to the base in a reverse orientation, the head waveguide positioned over a second portion of the plurality of prongs of the base waveguide in the reverse orientation, the second portion having a first prong that is excluded from the first portion and a second prong that is included in the first portion.

14. The method of claim 8, further comprising:
 positioning the head at a particular angle that is between 0 degrees and 360 degrees relative to the base, the head waveguide not making contact with the base waveguide at the particular angle.

15. The method of claim 8, wherein the plurality of prongs include one or more U-shaped prongs.

16. A computing device comprising:
 a base comprising:
  a base transceiver to:
   receive data from a base component of the base;
   encode the data into a signal; and
   transmit the signal at a frequency between about 30 Ghz and about 300 GHz; and a base waveguide including a first portion that is attached to the base and a second portion that is unattached to the base, the second portion of the base waveguide behaving as a spring to keep the base waveguide within a predetermined distance from a head waveguide, the base waveguide to:
  receive the signal transmitted by the base transceiver; and
  guide the signal.

17. The computing device of claim 16, further comprising:
a head comprising:
  one or more processors;
  one or more computer-readable storage media;
  the head waveguide having at least one prong to:
    receive the signal from the base waveguide; and
  a head transceiver to:
    receive the signal from the head waveguide;
    decode the data from the signal; and
    send the data to a head component of the head.

18. The computing device of claim 17, wherein attaching the head of the computing device to the base of the computing device comprises attaching the head to the base in one of a forward orientation or a reverse orientation.

19. The computing device of claim 18, wherein, when the head is attached to the base in the forward orientation, the head waveguide is positioned over a first portion of a plurality of prongs of the base waveguide.

20. The computing device of claim 19, wherein when the head is attached to the base in a reverse orientation, the head waveguide is positioned over a second portion of the plurality of prongs of the base waveguide in the reverse orientation, the second portion having at least a first prong that is excluded from the first portion and at least a second prong that is included in the first portion.

* * * * *